No. 809,203. PATENTED JAN. 2, 1906.
G. J. MILLER.
ANIMAL TRAP.
APPLICATION FILED MAR. 23, 1905.
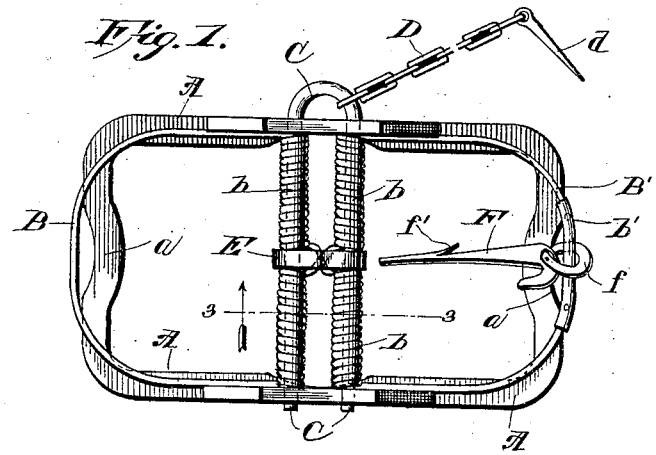
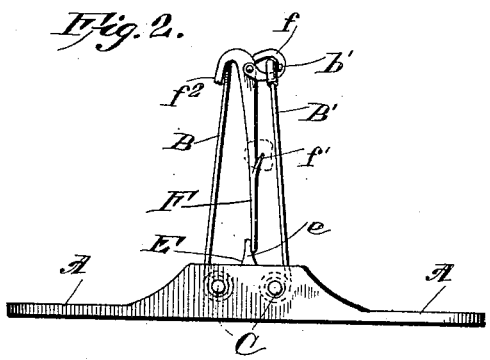
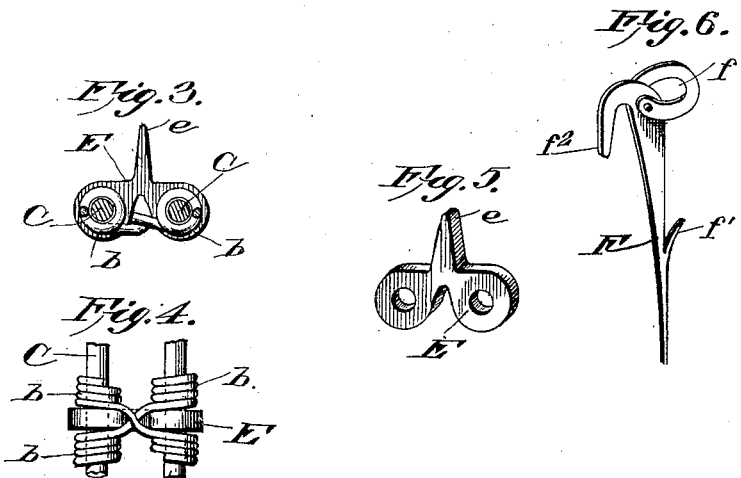
WITNESSES:
C. M. Callaghan
Amos W. Hart
INVENTOR
George J. Miller
BY Munn & Co.
ATTORNEYS

UNITED STATES PATENT OFFICE.

GEORGE J. MILLER, OF ENDICOTT, WASHINGTON.

ANIMAL-TRAP.

No. 809,203.   Specification of Letters Patent.   Patented Jan. 2, 1906.

Application filed March 23, 1905. Serial No. 251,700.

*To all whom it may concern:*

Be it known that I, GEORGE J. MILLER, a citizen of the United States, residing at Endicott, in the county of Whitman and State of Washington, have made certain new and useful Improvements in Animal-Traps, of which the following is a specification.

My invention is an improvement in that class of animal-traps which have spring-actuated bows or jaws adapted to be set in a retracted position and when released to snap down upon the animal's body.

The invention is particularly adapted when made of small size for catching moles.

It is an improvement upon the trap for which I have received Letters Patent No. 768,292.

The improvements are embodied in several features hereinafter described, and illustrated in the accompanying drawings, in which—

Figure 1 is a plan view of the trap in the sprung or unset condition. Fig. 2 is a side view of the trap, showing the spring-jaws raised and locked as when the trap is set for use. Fig. 3 is a cross-section on the line 3 3 of Fig. 1. Fig. 4 is a bottom plan view of the portion of the trap illustrated in Fig. 3. Fig. 5 is a face view of the catch or stop for holding the trigger or trip that engages the jaws when the trap is set. Fig. 6 is a perspective view of the trigger detached.

The body of the trap is a horizontal frame A, constructed of metal which is struck up in suitable form, so that the same is produced very cheaply and has but little weight. The trap is provided with bow-shaped spring-jaws B B', which are formed with coils $b$, that surround the members of a U-shaped bolt C, which extends through the side flanges $a$ of the frame and is detachably secured thereto. An anchoring-chain D, having a spike $d$, is attached to the semicircular or curved head of the bolt C. The two jaws B B' are formed of one piece of spring-wire. Thus a wire of proper length is bent at its middle to form the jaw D, and the two free members thereof are then coiled around one of the arms of the bolt C, as shown at $b$, Figs. 1 and 4, beginning at the sides of the frame A and progressing inward toward the middle, where the wires cross each other diagonally and are then wound outward in the same manner toward the sides of the trap and then bent at their extremities to form fangs or spikes $b'$. (See Figs. 1 and 2.) A metal sleeve is then applied to the adjacent and juxtaposed ends of the wires, so as to rigidly connect them, as in my former invention. Between the coils thus formed on the members of the bolt C, I arrange a catch or stop E for engaging the trigger F, by which the jaws are held when the trap is set. As shown in Figs. 3 and 5, the said catch is practically T shape, the legs or members of the bolt C passing through the body of the same and a portion $e$ projecting upward and constituting the catch proper, with which the trigger F engages, as illustrated in Fig. 2. By this construction and arrangement of parts the catch E is held securely in place on the bolt C and also serves to hold the coils $b$ separated, as shown.

The trigger F is formed as an elongated tapered bar constructed, preferably, of sheet-steel, the same having its upper end constructed as a hook whose short jaw projects at a considerable angle to the other, as shown in Fig. 6. An eye or loop $f$ is pivoted to the upper hooked end of the trigger F, and the body of the latter is provided with a prong $f'$ for holding the bait. The said eye or loop $f$ is applied to the sleeve of the spring-jaw B' and is held thereon by the fangs $b'$. Thus the trigger F constitutes a permanent but loose attachment of the jaw B'.

In order to set the trap, the jaws B B' are raised to a vertical position, as indicated in Fig. 2, and the hook $f^2$ of the trigger F is engaged with the jaw B, while the lower end of the trigger is placed in contact with the upwardly-projecting portion $e$ of the catch E. Such engagement prevents the hook $f^2$ from being disengaged from the jaw B, whereby both jaws would be released simultaneously. It is apparent, however, that when the trigger is disturbed by a mole or other animal nibbling at or seizing the bait the trigger will be disengaged from the catch E, thus instantly releasing the jaws, which snap down and strike upon the body of the animal with great force, so as to kill him or at least hold him securely.

As shown in Fig. 1, the ends of the frame A are bent or curved inward at $a$, so that the bows B B' extend beyond the curves when in horizontal position. This construction of the frame is advantageous, since it enables the jaws to strike the animal effectively—that is to say, to injure him to a greater degree, and in the case of moles, to break the backs of the same, so that they are instantly killed.

What I claim is—

1. In an animal-trap of the class indicated, the combination, with a horizontal base-frame, and bars which extend centrally across the same, of spring-jaws formed of a single piece of spring-wire, the same being bent at its middle to form one of the jaws and coiled around the adjacent bar and crossed to and coiled about the other bar, the ends of the wire being extended and connected to form the other jaw, substantially as described.

2. In a trap of the class indicated, the combination, with the horizontal base-frame, and bars traversing the same at its center, of spring-jaws having coils embracing the bars, a trigger for connecting the jaws when set, and a catch applied to the bars between the coils, for engaging the trigger, substantially as described.

3. The combination, with a horizontal base-frame and bars extending across the same, of a catch applied to said bars, spring-jaws, and a trigger for securing them when set, the same being adapted for engagement with the catch in the manner described.

4. The combination, with a horizontal base-frame, spring-jaws, and a catch arranged in the middle of the frame, of a trigger adapted to connect the jaws when set and to engage the catch, whereby the trigger is held until tripped, substantially as described.

5. The combination, with a horizontal base-frame, a U-shaped bolt passing through the same transversely, the spring-jaws formed of a wire coiled about the members of the bolt, and a trigger, of a T-shape catch, the members of the bolt passing through the body or head of the catch and the latter projecting upward, in the manner described.

GEORGE J. MILLER.

Witnesses:
R. A. WOODS,
GUY CHENEY.